United States Patent
Orlovskaya et al.

(10) Patent No.: US 10,401,023 B2
(45) Date of Patent: Sep. 3, 2019

(54) PEROVSKITE CATALYSTS ENHANCED COMBUSTION ON POROUS MEDIA

(71) Applicant: UNIVERSITY OF CENTRAL FLORIDA RESEARCH FOUNDATION, INC., Orlando, FL (US)

(72) Inventors: Nina Orlovskaya, Orlando, FL (US); Ruey-Hung Chen, Orlando, FL (US); Manuel Robayo, Oviedo, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 46 days.

(21) Appl. No.: 15/126,681

(22) PCT Filed: Mar. 17, 2015

(86) PCT No.: PCT/US2015/020971
§ 371 (c)(1),
(2) Date: Sep. 16, 2016

(87) PCT Pub. No.: WO2015/142852
PCT Pub. Date: Sep. 24, 2015

(65) Prior Publication Data
US 2017/0089571 A1 Mar. 30, 2017

Related U.S. Application Data

(60) Provisional application No. 61/954,060, filed on Mar. 17, 2014.

(51) Int. Cl.
*F23C 13/08* (2006.01)
*B01J 23/00* (2006.01)
(Continued)

(52) U.S. Cl.
CPC ............ *F23C 13/08* (2013.01); *B01J 23/002* (2013.01); *B01J 23/6522* (2013.01);
(Continued)

(58) Field of Classification Search
CPC ................................ B01J 27/224; F23C 13/08
(Continued)

(56) References Cited

U.S. PATENT DOCUMENTS

| 4,049,583 A | 9/1977 | Lauder |
| 5,318,937 A | 6/1994 | Jovanovic et al. |

(Continued)

OTHER PUBLICATIONS

International Search Report and Written Opinion Form PCT/ISA/220, International Application No. PCT/US2015/020971, pp. 1-10, International Filing Date Mar. 17, 2015.
(Continued)

*Primary Examiner* — Avinash A Savani
*Assistant Examiner* — Aaron H Heyamoto
(74) *Attorney, Agent, or Firm* — Bond Schoeneck & King, PLLC; George McGuire; William Greener

(57) ABSTRACT

The effects of different perovskite catalysts, catalytic active materials with a crystal structure of $ABO_3$, on matrix stabilized combustion in a porous ceramic media are explored. Highly porous silicon carbide ceramics are used as a porous media for a catalytically enhanced matrix stabilized combustion of a lean mixture of methane and air. A stainless steel combustion chamber was designed incorporating a window for direct observation of the flame within the porous media. Perovskite catalytic enhancement of SiC porous matrix with La0.75Sr0.25Fe0.6Cr0.35Ru0.05O3; La0.75Sr0.25Fe0.6Cr0.4O3; La0.75Sr0.25Fe0.95Ru0.05O3; La0.75Sr0.25Cr0.95Ru0.05O3; and LaFe0.95Ru0.05O3, for example, were used to enhance combustion. The flam-
(Continued)

mability limits of the combustion of methane and air were explored using both inert and catalytically enhanced surfaces of the porous ceramic media. By coating the SiC porous media with perovskite catalysts it was possible to lower the minimum stable equivalence ratio.

12 Claims, 9 Drawing Sheets

(51) Int. Cl.
```
B01J 23/652      (2006.01)
B01J 23/86       (2006.01)
B01J 23/89       (2006.01)
B01J 27/224      (2006.01)
```
(52) U.S. Cl.
CPC ........... *B01J 23/862* (2013.01); *B01J 23/894* (2013.01); *B01J 23/8906* (2013.01); *B01J 23/8946* (2013.01); *B01J 23/8993* (2013.01); *B01J 27/224* (2013.01); *B01J 2523/00* (2013.01)

(58) Field of Classification Search
USPC .......................................................... 431/7
See application file for complete search history.

(56) References Cited

U.S. PATENT DOCUMENTS

| | | | |
|---|---|---|---|
| 5,939,354 A * | 8/1999 | Golden ................ | B01D 53/945 502/302 |
| 2005/0201906 A1* | 9/2005 | Alvin ........................ | F23R 3/40 422/177 |
| 2011/0070139 A1* | 3/2011 | Kim ................... | B01D 53/9477 423/239.1 |
| 2017/0077376 A1* | 3/2017 | Orlovskaya ............. | F23C 13/08 |

OTHER PUBLICATIONS

Robayo, Manuel David, Perovskite Catalysts Enhanced Combustion on Porous Media and Thermoelectric Power Conversion, 2014, Electronic Theses and Dissertations, University of Central Florida, Paper 4764, http://stars.library.ucf.edu/etd/4764, pp. 1-94.

University of Central Florida, Perovskite Catalysts for Porous Media in Internal Combustion Engines, Technology Available for Licensing, tt.reserach.ucf.edu, 2015, p. 1.

* cited by examiner

PEROVSKITE CATALYSTS ENHANCED COMBUSTION ON POROUS MEDIA

RELATED APPLICATION DATA

The present application claims priority to and the benefit of U.S. provisional patent application No. 61/954,060, filed on Mar. 17, 2014, the entire contents of which are hereby incorporated by reference.

FIELD OF THE INVENTION

The present disclosure is directed generally to combustion apparatuses, and more particularly, to superadiabatic combustion utilizing a perovskite composition catalytically enhanced porous matrix, in matrix stabilized porous burner technology.

BACKGROUND

Matrix stabilized porous burner technology is an advanced combustion method in which a mixture of fuel and oxidizer is burned within a solid porous medium, as opposed to open, burner-stabilized flames such as that on a Bunsen burner. The advantages of porous burners over that of burner-stabilized flames is mainly due to the thermal feedback effect provided by the solid medium through which heat conduction in the upstream direction results in preheating the incoming reactants. The process yields a flame temperature higher than the equilibrium adiabatic value achievable by the fuel-oxidizer mixture in the absence of a porous medium. This process is called superadiabatic combustion. The heat transfer can be further enhanced by increasing the surface area to volume ratio of the porous medium and by the increased mixing due to turbulence generated in the porous structure. Therefore porous burners help to sustain lean flames of fuel-oxidizer mixtures lower than the conventionally known lean flammability limit, and can also be used for burning low-calorific gases. Applications of porous burner technology include power generation via thermoelectric devices, small scale heating purposes, and combustion of low-calorific value landfill-seepage gases.

It is generally accepted that alumina ($Al_2O_3$) porous matrix is catalytically inert and does not participate in the enhancement of the combustion reaction inside of the porous media. Some attempts were used to investigate the effect of silicon carbide (SiC) ceramic to verify if the lean limit can be extended in the combustion inside of the SiC porous matrix. Previous work on superadiabatic combustion in $Al_2O_3$ and SiC coated porous media was devoted to the investigation of temperature and lean limits for combustion reactions and comparison of the performance of these two materials. In that work, the porous burner was built utilizing porous alumina foam with 85% of porosity, 2-3 mm average pore size, as a combustion chamber. Two honey comb alumina flame arresters were located at both sides of the porous matrix to ensure the efficient gas mixture delivery to the combustion zone, the three alumina parts were enclosed inside of the stainless steel casing and one thermoelectric module was attached to the hot surface of the steel casing that electric current can be generated and power can be harvested from the produced heat. It was established that SiC surfaces of the porous combustion matrix might be a good promoter of the combustion for the stoichiometric fuel to air ratio, which performed in a better way in comparison with inert $Al_2O_3$ surfaces. However, SiC coated porous media did not outperform the inert $Al_2O_3$ matrix when the lean mixtures were used. The microscopy analysis of the surfaces of the of the porous media within the zones where combustion occurred revealed that while the carbon deposits were formed on catalytically inert $Al_2O_3$ surfaces, there were no deposits found on the SiC coated surfaces in the case where stoichiometric mixtures were used. Thus, SiC helps to promote the complete combustion reactions, however, it is possibly prone to the oxidation itself during combustion and, once the significant amounts of $SiO_2$ phase forms on the surface of SiC, the catalytic properties of the ceramic will degrade.

Noble metals, such as platinum (Pt) or palladium (Pd), show high methane combustion activity at low temperature, and they, indeed, are very promising candidates to promote combustion reactions. However, while catalytic activity of noble metals is high, their cost is also very high, and their possible sublimation and/or sintering can occur in a catalytic burner at high temperatures in the presence of water and $CO_2$ gasses. Another problem in the catalytic combustion of methane and other hydrocarbons is carbon deposition and, as a result, catalyst deactivation.

Porous burner technology, as described herein above, in internal combustion engines fuels everyday machines including water heaters, gas stoves, boilers, and portable generators, along with turbine combustion chambers and more. Conventional engines have relied on complex control equipment and large devices whose configurations created undesirably large pressure drops across the combustion chambers, compromising ideal combustion efficiency while requiring intricate control systems, making them impractical for use outside of academia.

Accordingly, due to increasing levels of environmental concerns and conservation of energy resources, there is a need in the art for burning low-calorific value gases and lean mixtures. Additionally, there is a need in the art for new and more active catalysts that would be better suited to promote combustion, reduced the recirculated energy requirement needed to stabilize the flame, and facilitate the superadiabatic combustion to generate cheap and efficient heat without significant pressure drop.

Background Section Disclaimer: To the extent that specific patents/publications/experiments/work are discussed above in this Background Section or elsewhere in this application, these discussions should not be taken as an admission that the discussed patents/publications/products are prior art for patent law purposes. For example, some or all of the discussed patents/publications/experiments/work may not be sufficiently early in time, may not reflect subject matter developed early enough in time and/or may not be sufficiently enabling so as to amount to prior art for patent law purposes. To the extent that specific patents/publications/products are discussed above in this Background Section and/or throughout the application, the descriptions/disclosures of which are all hereby incorporated by reference into this document in their respective entirety(ies).

SUMMARY OF THE INVENTION

The present disclosure is directed to an inventive structure, configuration, and resulting function of combustion apparatuses including matrix stabilized porous burners with catalytically enhanced porous matrix portions. Various embodiments and implementations herein are directed to porous media, such as a high temperature ceramic comprising alumina and/or silicon carbide, which includes a catalytic coating including perovskite catalysts—materials with a crystal structure $ABO_3$, where the large cation A has a dodecahedral co-ordination and the smaller B cation, usually also a transition metal, has a six-fold co-ordination.

Using the various embodiments and implementations herein, the temperature within the porous media can be (1) high enough to support heat and power applications while also (2) low enough for the catalysts to remain active and keep materials in the combustion chamber of a combustion apparatus containing the porous media from degrading as the materials would at uncontrolled high temperatures. Accordingly, the catalyst enhancement of an embodiment can improve temperature conditions for more efficient fuel-burning. The catalyst-coated porous media of an embodiment enables combustion of lean mixtures—fuels with a high percentage of air and a low percentage of fuel—which allows for fuel flexibility. This makes more energy per dollar possible since applications can burn low-calorific fuels that generate fewer harmful emissions. Simple, efficient porous media minimizes environmental contamination and conserves energy resources without sacrificing performance. This porous burner technology can be critical when generating power from thermoelectric devices, small-scale heating, and combustion of low-calorific value landfill-seepage gases. In particular, the porous burner technology of an embodiment can be used, for example, in internal combustion engines, water heaters, gas stoves, boilers, and portable generators.

Generally in one aspect, a matrix stabilized porous burner is provided and includes, but is not limited to: a combustion chamber comprising a porous ceramic matrix catalytically enhanced with a perovskite catalyst composition selected from the group consisting of $La_{0.75}Sr_{0.25}Fe_{0.6}Cr_{0.35}Ru_{0.05}O_3$; $La_{0.75}Sr_{0.25}Fe_{0.6}Cr_{0.4}O_3$; $La_{0.75}Sr_{0.25}Fe_{0.95}Ru_{0.05}O_3$; $La_{0.75}Sr_{0.25}Cr_{0.95}Ru_{0.05}O_3$; and $LaFe_{0.95}Ru_{0.05}O_3$.

In accordance with an embodiment, the porous ceramic matrix includes a silicon carbide porous ceramic matrix portion, and the perovskite catalyst is coated on the surface of the porous silicon carbide ceramic matrix portion.

In accordance with an embodiment, the porous ceramic matrix further includes an alumina porous ceramic matrix portion positioned adjacent to the silicon carbide porous ceramic matrix portion.

In accordance with an embodiment, the burner produces a stabilized combustion of a lean mixture of natural gas and air.

In accordance with an embodiment, porous ceramic matrix includes 85% porosity silicon carbide.

In accordance with an embodiment, the burner is a unidirectional porous burner.

Generally in another aspect, a method for the Superadiabatic combustion of reactants is provided and includes, but is not limited to the steps of providing a matrix stabilized porous burner including: a combustion chamber comprising a porous ceramic matrix catalytically enhanced with a perovskite catalyst composition selected from the group consisting of $La_{0.75}Sr_{0.25}Fe_{0.6}Cr_{0.35}Ru_{0.05}O_3$; $La_{0.75}Sr_{0.25}Fe_{0.6}Cr_{0.4}O_3$; $La_{0.75}Sr_{0.25}Fe_{0.95}Ru_{0.05}O_3$; $La_{0.75}Sr_{0.25}Cr_{0.95}Ru_{0.05}O_3$; and $LaFe_{0.95}Ru_{0.05}O_3$; and reacting a fuel air mixture in the combustion chamber.

In accordance with an embodiment, the porous ceramic matrix includes a silicon carbide porous ceramic matrix portion, and the perovskite catalyst is coated on the surface of the porous silicon carbide ceramic matrix portion.

In accordance with an embodiment, the porous ceramic matrix further includes an alumina porous ceramic matrix portion positioned adjacent to the silicon carbide porous ceramic matrix portion.

In accordance with an embodiment, the fuel air mixture is a lean mixture of natural gas and air.

In accordance with an embodiment, the porous ceramic matrix includes 85% porosity silicon carbide.

In accordance with an embodiment, the burner is a unidirectional porous burner.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
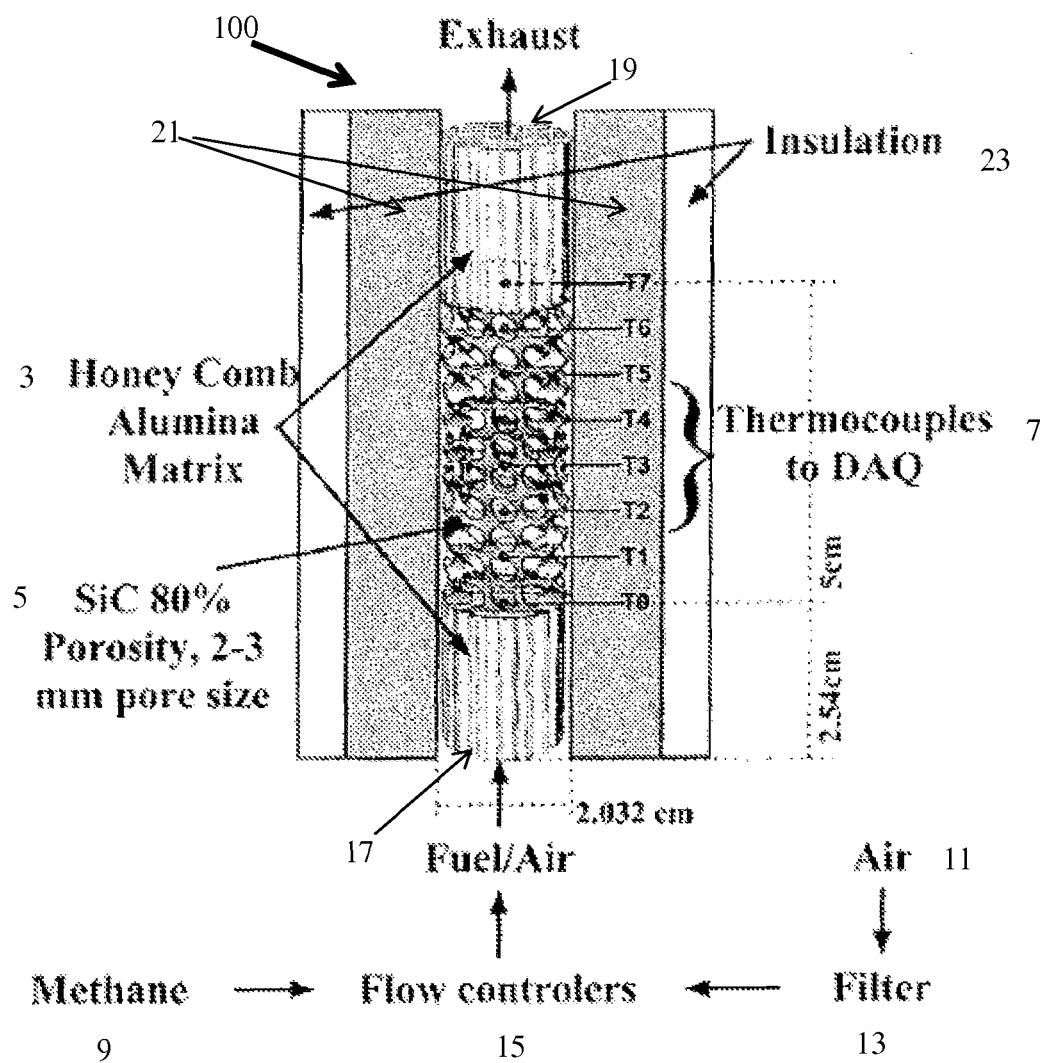
FIG. 1 is a schematic representation of a matrix stabilized porous burner with a combustion chamber in accordance with an embodiment.

The present disclosure describes various embodiments of an improved combustion apparatus including a matrix stabilized porous burner with a catalytically enhanced porous matrix portion. More generally, Applicants have recognized and appreciated that transition metals are considered excellent catalysts for many applications. Perovskite catalysts containing at least one transition metal, such as $LaFeO_3$ or $LaCrO_3$, are attractive materials because their crystal structure serves as the support for the transition metal ions due to its high thermal stability as well as other properties. To inhibit carbon deposition, which can lead to deactivation of the catalysts, such promising solutions as reduction of perovskite phase to precipitate small metal particles at the surfaces of oxides resulting in high activity and sustainability against coke formation can be done. Mixed ionic electronic perovskite $ABO_3$ based catalyst has also been proposed as thermally stable and catalytically active materials. The promising $ABO_3$ perovskite compositions contain rare earth cations located on the A-site of perovskite lattice where large $A^{3+}$ cations (such as lanthanum $La^{3+}$ ion) have been substituted with different $A^{2+}$ cations (such as strontium $Sr^{2+}$, calcium $Ca^{2+}$, or barium $Ba^{2+}$) introducing oxygen vacancies in the lattice and at the same time inducing the mixed valence state in B-site cations such that cobalt ($Co^{3+}$), manganese ($Mn^{3+}$), or iron ($Fe^{3+}$) become a mixture of $Co^{3+}/Co^{4+}$; $Mn^{3+}/Mn^{4+}$, and $Fe^{3+}/Fe^{4+}$. Oxidation reactions over the perovskite materials have been found to follow two routes, either incorporating surface absorbed oxygen species or incorporating the mobility of lattice oxygen and a redox cycle of the B-ion. The catalytic activities of $LaCoO_3$ and $LaMnO_3$ catalysts were investigated in comparison with hexaluminate catalysts ceramics. $LaCoO_3$ showed comparable activity to the most active hexaluminate, even though its surface area was only one tenth of the hexaaluminate's. Additionally perovskites have shown promising performance toward methane oxidation and even in gasified biomass testing.

Applicants have also recognized and appreciated that LaCoO3 has been investigated as a catalyst toward $CO_2$ reforming of $CH_4$ in comparison with LaNiO3 perovskite and La2NiO4 and La2CoO4 ceramic materials. Based $LaCoO_3$, $LaMnO_3$, and $LaFeO_3$ perovskites were investigated as promoters for methane oxidation, and the nature of the active sites on the surfaces of these oxides were also investigated. It was established that the significant quantities of carbonated species were found on the surfaces of perovskites. The addition of carbonates to rare earth oxides is known to improve the selectivity for the oxidative coupling of methane. The oxidative coupling of methane is the process of converting methane into value added chemicals through catalysts, a hard process due to methane's high chemical stability. However, it was established that the catalytic performance of pure perovskites, such as $LaFeO_3$ or $LaCoO_3$, were significantly improved by doping $La^{3+}$ with $Sr^{2+}$ ion. It was shown that while both cobaltites and ferrites, which are perovskites with the crystal structure $ACoO_3$ and $AFeO_3$ respectively, showed similar catalytic behavior in methane combustion, $La_{1-x}Sr_xCoO_{3-\delta}$ perovskites were much more easily reduced by $H_2$ or $CH_4$ in comparison with $La_{1-x}Sr_xFeP_{3-\delta}$ perovskites. It has been reported that $La_{1-x}Sr_xCoO_3$ catalysts achieved better than Pt performance in treating $NO_x$ in fuel-efficient diesel engines. Other substitutions of A and B sites in perovskite structures, such as with silver ions (Ag), cerium ions (Ce), praseodymium (Pr), samarium (Sm), europium ions (Eu), as well as the addition of precious metals, such as Pd, and their regeneration, can provide a significant synergistic effect for enhancement of catalytic activity of the material and proposed to be an effective tool of catalyst design and customization. Several studies have been performed on ruthenium (Ru) containing perovskites where oxidation of CO was performed over $La_{0.7}Sr_{0.3}Cr_{1-x}Ru_xO_3$ $(0.025 \leq x \leq 0.100)$ perovskite type catalysts. Improved catalytic activity has been reported along with decreased surface resistivity when it was established that the concentration of $Ru^{4+}$ in the surface region and its stability are both determining factors for the CO oxidation activity. Another Ru ion containing compositions, such as $La_{0.6}Sr_{1.4}Fe_{0.8}Ru_{0.2}O_{4\pm\delta}$, $La_{0.4}Sr_{1.6}Fe_{0.7}Ru_{0.3}O_{4\pm\delta}$, and $La_{0.2}Sr_{1.8-}Fe_{0.6}Ru_{0.4}O_{4\pm\delta}$ have been shown to exhibit promising electrical properties at high temperature and therefore might also potentially be considered as a good catalyst.

A particular goal of utilization of the embodiments of the present disclosure is the ability of the embodiments of the matrix stabilized porous burner with a catalytically enhanced/coated porous matrix portion to provide the further benefit of increased flame stability and control of the flame location inside of the porous matrix. The feedback of heat transfer from products to the reactants can be, in part, a function of the porous media thickness and the position of the flame within it with respect to the media's inlet, and outlet. By employing perovskite catalysts of an embodiment the activation energy of the reaction can be reduced, lowering the amount of heat recirculated required for stable combustion within the media. Allowing the flame of a lean mixture to stabilize closer from the inlet of the catalytically enhanced porous structure, at any given flow rate and lean equivalence ratio, increases the range of locations where a flame can be stabilized within the media and decreasing its possible minimum stable equivalence ratio.

Another particular goal of utilization of the embodiments of the present disclosure is the ability of the embodiments of the combustion apparatus to provide certain benefits of catalytically promoted combustion. These benefits include an extremely low amount of NOx production, due to the fact that the reaction is catalytic and there are preferably no high temperature flame zones where NOx is typically produced. Simultaneously, there can be a dramatic reduction in the amount of unburned carbon and partially oxidized carbon, i.e., due to the catalytic drive of the combustion reaction to full completion.

In view of the foregoing, various embodiments and implementations are directed to a combustion apparatus including porous burner with a combustion chamber including a catalytically enhanced, porous ceramic matrix. The combustion chamber can utilize high temperature porous ceramics enhanced with high temperature ceramic catalysts for lean combustion of natural gas. The design features of the combustion chamber include a high temperature (85% porosity) ceramic, including alumina and silicon carbide, coated with high temperature perovskite catalysts. As previously noted, perovskite catalysts are materials with a crystal structure $ABO_3$.

In accordance with an embodiment, a matrix stabilized porous burner with a combustion chamber 100 (see FIG. 1), components thereof, methods for making, and applications thereof are described below. To extend the lean burning limits using the porous burner, catalysts can be coated on the Surfaces of the porous medium. This can be particularly advantageous because the porous structure possesses a large Surface to Volume ratio, providing the much needed surface area for applications of heterogeneous catalysts. The Examples below present the results of adding five different types of perovskite catalysts $La_{0.75}Sr_{0.25}Fe_{0.6}Cr_{0.35}Ru_{0.05}O_3$, $La_{0.75}Sr_{0.25}Fe_{0.6}Cr_{0.4}O_3$, $La_{0.75}Sr_{0.25}Fe_{0.95}Ru_{0.05}O_3$, $La_{0.75}Sr_{0.25}Cr_{0.95}Ru_{0.05}O_3$, and $LaFe_{0.95}Ru_{0.05}O_3$, to a base silicon carbide (SiC) porous structure.

In the Examples below, a unidirectional porous burner is described with reference to the Figures. High temperature porous ceramics e.g., alumina, silicon carbide or other similar properties materials, are used to stabilize the flame and can be coated with high temperature perovskites catalysts of an embodiment. Materials such as ferrites or cobaltites, which are perovskites with the crystal structure $ACoO_3$ and $AFeO_3$), are contemplated. The A site, usually lanthanum, can be doped with strontium Sr2+or calcium Ca2+to change the Valence of the materials thus increasing the catalytic activity of the perovskite. Additionally the B site can be doped with other transition metals such as ruthenium Ru, or palladium Pd which in turn also increase the materials catalytic activity. In this way Such perovskite catalyst composition, Such as: $La_{0.75}Sr_{0.25}Fe_{0.6}Cr_{0.35}Ru_{0.05}O_3$, $La_{0.75}Sr_{0.25}Fe_{0.6}Cr_{0.4}O_3$, $La_{0.75}Sr_{0.25}Fe_{0.95}Ru_{0.05}O_3$, $La_{0.75}Sr_{0.25}Cr_{0.95}Ru_{0.05}O_3$, and $LaFe_{0.95}Ru_{0.05}O_3$ can be used in embodiments disclosed and contemplated herein, and are further described herein and below.

The relationship between these three features is noted below. To be concise, previous state of the art porous burners "designed" for lean applications, such as reciprocal flow burners and others, need very complicated equipment (in case of the reciprocal flow burners), or a large porous ceramic beds to reduce the natural gas' lean combustion limit. Their configuration creates a large pressure drop across the combustion chamber, additionally their intricate control systems make them costly and not feasible outside academia. In accordance with an embodiment, a rather small porous burner bed can be in conjunction with state of the art catalysts to decrease the lean limit of combustion of natural gas.

A careful balance was designed between catalytic combustion, the heat recirculation in porous media, and the combustion of lean fuels. In combustion within porous media, the temperature of the reacting fuel air mixture can approach and even exceed the adiabatic flame temperature of the given mixture. Both catalytic combustion and combustion in porous media reduce natural gas' lean limit. But due to the high temperature generated, catalysts, even perovskites, can be subject to degradation. However, in view of the novel approach of coupling high temperature perovskite catalysts and combustion in porous media of an embodiment as described herein, it is possible to, in a very simple configuration: reduce the lean limit of a mixture of natural gas' and air to produce a flame where the temperature is low enough for the perovskite catalysts remain active, low enough for the materials within the combustion chamber not to degrade, and high enough for temperature within the fluid mixture to be ideal for heat and power applications.

In accordance with an embodiment, the enhanced matrix stabilized porous burner with a combustion chamber 100 increases efficient stable combustion of lean mixtures. This increase in efficiency is an excellent feature for existing systems, looking to increase the efficiency, and decrease the emission of existing combustion systems. These innovative features enable lower emissions and a higher efficiency than the burners that are used in current commercial combustion chambers, in addition to fuel flexibility. This would enable users to get more energy per dollar, the ability to burn low calorific fuels as well as heavy fuels such as JP8, while generating less harmful emissions, thus helping the United States government, for example, in its fight to attain the high level of environmental and fiscal conscientiousness that they are currently striving to reach.

Advantages of the invention are illustrated by the following Examples. However, the particular structures, configurations, materials and amounts thereof recited in these Examples, as well as other conditions and details, are to be interpreted to apply broadly in the art and should not be construed to unduly restrict or limit the invention in any way.

The Examples describe a study of superadiabatic combustion of methane inside of the porous matrixes with catalytic enhancement by perovskites. Five different perovskite compositions were used for methane combustion utilizing different equivalence ratios (Φ) and the obtained results were compared to the methane combustion in a SiC porous matrix where no perovskite promoter was present. The lean limit was established depending on the perovskite composition, as well as temperature measurements and determination of the combustion zone locations was performed. The perovskite composition which showed the best results for lean superadiabatic combustions was established.

Example 1

This Example describes the experimental setup used in the study. Referring to FIG. 1, in one embodiment, a schematic representation of a matrix stabilized porous burner with a combustion chamber 100 is provided. More particularly, the combustion chamber 100 can be composed of two types of porous media: two alumina honeycombs 3 at each end of the combustion chamber, and a reticulated SiC or alumina foam 5 in the middle. Eight K-Type thermocouples (T0-T7; collectively "7") were placed along the axis of the cylindrical SiC foam, equidistantly spaced, 0.72 cm apart, as seen in FIG. 1. These eight thermocouples measured the temperature distribution within the combustion chamber. They have an uncertainty of 0.75% from 0 to 1250° C. The thermocouples were connected to a National Instruments data acquisition system (NI USB-6210), and then logged into LabView virtual instrument for data collection.

High grade methane 9 (99% purity) and dry laboratory compressed air 11 were used in the experiment. The mixture of methane 9 and air 11 (which can pass through filter 13) was formed in a line of sufficient length to allow proper mixing after the two reactant streams meet at a T-junction. The air and methane flows were each controlled with Omega (FMA 3200) mass flow controllers 15. The flow controllers have an uncertainty of ±1.5% of their full scale range of 0-5 L/min and 0-10 L/min for the methane and air flow meters, respectively. The fuel/air mixture is shown entering the combustion chamber 100 at a first inlet end 17 and exiting as exhaust at a second exhaust end 19.

Figure 2:
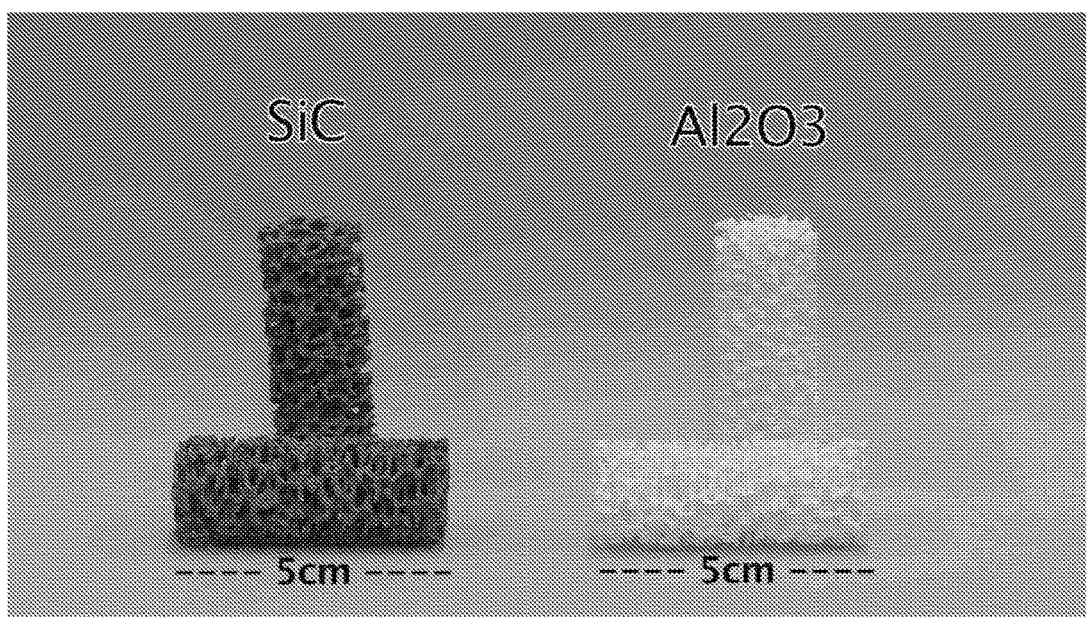
FIG. 2 is an image of the cylindrical reticulated foam portions used in the matrix stabilized porous burner with a combustion chamber shown in FIG. 1 in accordance with an embodiment.

Images of the cylindrical reticulated foam used in the study are shown in FIG. 2 (silicon carbide used as the reticulated ceramic foam 5, and alumina used as the reticulated ceramic foam 3, each of which is used to stabilize the flame inside of the combustion chamber 100); the foam is highly porous (85%), has a diameter of 20.32 mm, a length of 50.8 mm, and an average pore size of 2-3 mm. The lower porosity (38%) alumina honeycomb ceramic cylinders 3 that are placed at the inlet 17 and at the exhaust 19 of the combustion chamber, on either side of the reticulated foam 5, has 8 pores per centimeter, a diameter of 20.32 mm, and a length of 25.4 mm. The average pore size of the honeycomb alumina 3 is much lower than the articulated foam's 5; this allows the flame to propagate along the axis of the articulated foam ceramic but to quench at top surface of the honeycomb. The honey comb ceramic acts as a flame arrestor due to its lower average pore size, forcing the combustion zone to be in reticulated ceramic foam section 5 of the burner.

Figure 3:
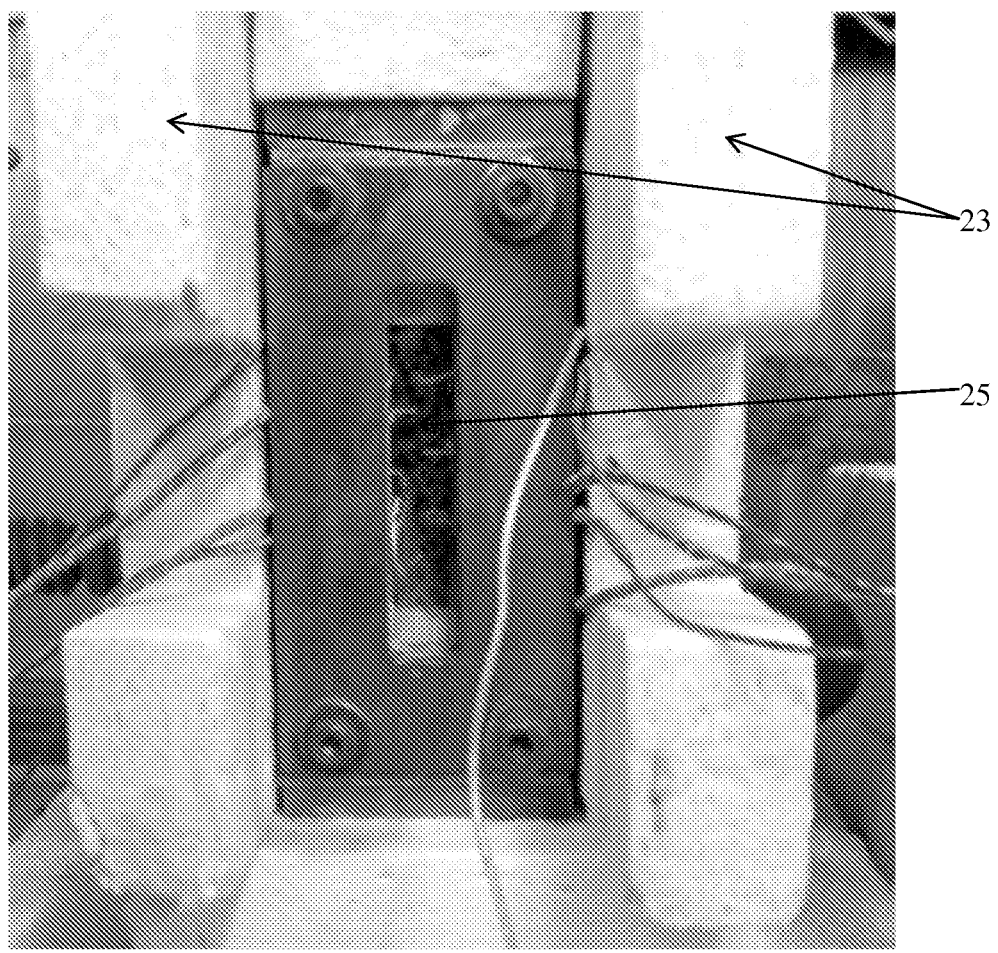
FIG. 3 is an image of the matrix stabilized porous burner with a combustion chamber shown in FIG. 1 with insulation panels in accordance with an embodiment.

The combustion chamber enclosing the porous burner can be composed of stainless steel 21 and can feature a quartz window (not shown) that allows observation of the flame behavior during ignition. In this study, the assembly featured a casing that was insulated on every side with a 25.4 mm thick ceramic fiber board insulation 23 as seen in FIG. 3 (the panel covering the window is not shown to showcase additional details), to reduce heat loss from the burner, to increase the repeatability of the experiments, and to ensure the measurable effects of the catalysts activity in the chemical reaction.

Example 2

This Example describes the preparation of the multiple samples of reticulated foam ceramics use in the study. In addition to the uncoated inert reticulated foam, perovskite catalyst coated reticulated foams were used. By conducting several runs of both inert and catalytically enhanced reticulated foams, the run to run variation and repeatability could be measured.

The catalytically enhanced ceramics were coated using the dip coating method. In brief, eight samples of SiC articulated foams were coated with five different compositions of perovskite catalysts (as referenced above). The dip coating process consisted of dissolving the perovskite powders in isopropyl alcohol and placing the slurry mixture in a test tube submerged in a water bath within an ultrasound machine to ensure homogenization of the slurry. The reticulated foam ceramic was then lowered into the slurry and held suspended for one minute, which allowed enough time for the coating to penetrate the pores and bond to the surface. Once coated the reticulated foam was placed in a tray and allowed to dry overnight in the fume hood until all the isopropyl alcohol had evaporated.

Example 3

This Example describes the initial ignition and use of the burner in the study, in addition to certain related results. The reactants enter the burner from the bottom portion 17 of the combustion chamber 100 as seen in FIG. 1. The burner is first ignited, near the top of the reticulated foam ceramic or at the thermocouple location T7, at $\Phi=1.0$. Once ignited the $\Phi$ is reduced to 0.7. The fuel flow rate was varied to obtain the desired $\Phi$, the air volumetric flow rate is held constant at 0.008 m3/min throughout the experiment. After ignition, at $\Phi=0.7$, the premixed combustion wave will propagate in the opposite direction of the flow. Through the quartz window (FIG. 3, ref. No. 25), the combustion zone was observed as a highly luminescent zone slowly traveling upstream. The combustion wave is allowed to travel against the direction of the flow to record the eventual downstream movement of the wave once the $\Phi$ is further reduced. This initial value of $\Phi=0.7$ is used to warm up the combustion chamber. If any of the eight thermocouples reach a steady-state temperature higher than 1,200° C., the volumetric flow rate of methane is reduced while maintaining the air flow rate constant, reducing $\Phi$ which will cause the temperature to drop. The combustion chamber is never allowed to reach temperatures well above 1200° C. for prolonged periods of time to protect burner components such as the quartz window and thermocouple wires. Preheating has a significant effect on combustion on porous media, it was important in this work that the burner was essentially "saturated" with the thermal energy before continuing with the minimum $\Phi$ measurement. By such saturation, the effect of catalysts can be accurately accessed.

The burner was determined to have reached the steady state if the temperature readings and the flame position had remained steady for 10 minutes. All the temperature data here reported are those measured during the steady state. It is noted that, when discussing the results of FIG. 4 below, this 10-minute criterion was applied whenever the $\Phi$ was changed, for example, to reach the condition near the flammability limit. The lean flammability limit was reached at the $\Phi$ for which the flame failed to maintain a steady location. The process was repeated for the reticulated foams investigated to document the behavior of the different catalytically treated or untreated reticulated foam ceramics.

By decreasing the $\Phi$ in the burner in a step-wise manner, the flame will start moving in a step-wise manner downstream. As the flame moves downstream incoming reactants will cool down the upstream section of the solid ceramic core, increasing the temperature difference between it and the part of the solid downstream from the combustion wave increasing the heat transfer back to the reactants. Eventually the heat loss, heat recirculated, and thermal energy generated will reach a balance and the combustion wave will begin to "stand" and reach steady state. As the step-wise downstream movement of the flames nears the end of the solid ceramic length, the radiation to the surroundings becomes a greater portion of the total heat loss. Further decreases in $\Phi$ cause the flame to blow off.

Figure 4:
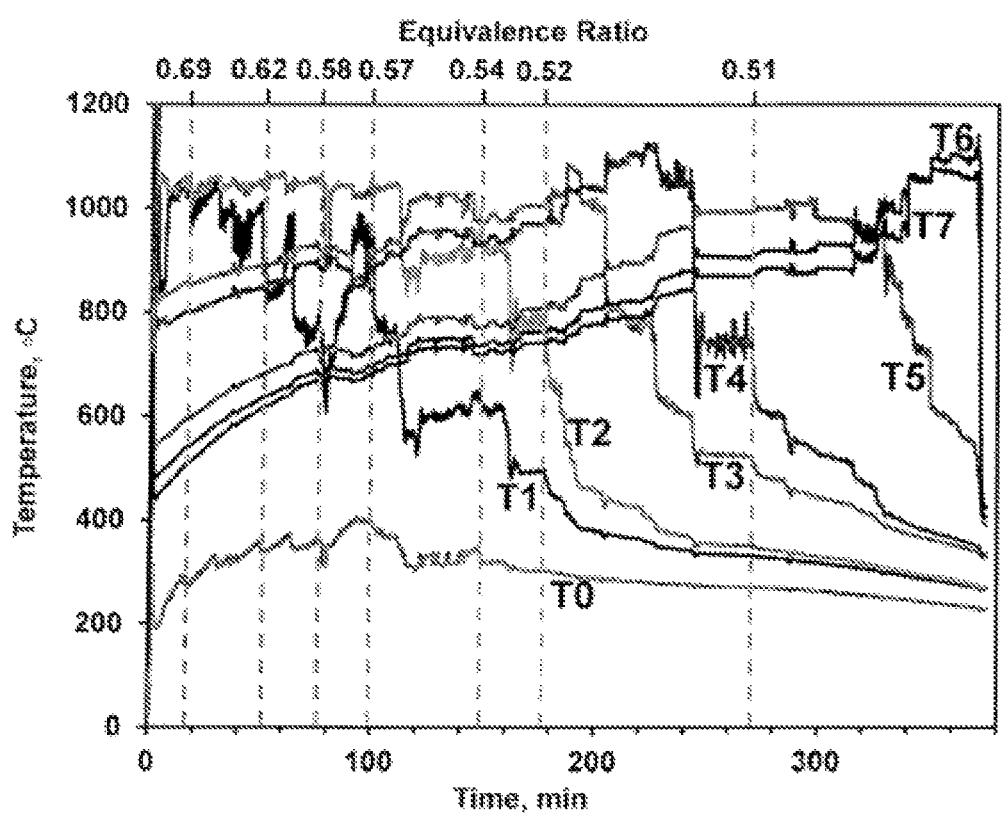
FIG. 4 is a graphical representation of temperature vs. time of non-coated SiC foam in accordance with an embodiment.

Referring to FIG. 4, in one embodiment, a graphical representation of temperature vs. time of non-coated SiC foam is shown as the equivalence ratio of the mixture is reduced and steady state temperature profile measurements are taken. Stated differently, FIG. 4 shows the typical time trace of temperature collected from the experiments presented in this study. During the preheating stage of the experiments the flame will propagate upstream and begin to stand near thermocouple location T2, as seen at minute 0 in FIG. 4. Once steady state is reached, or the temperature approaches 1,200° C. the amount of methane in the mixture is reduced, for the reasons mentioned above. The $\Phi$ was reduced at minute t=19, t=45, t=78, t=100, t=145, t=178, and t=265, shown by the dash lines in FIG. 4. The decrease in $\Phi$ would result in less heat generated to heat up the incoming fuel-air mixture, and therefore, there would be insufficient heat to sustain a stable combustion at a fixed position. The combustion wave will retreat to a downstream location, until a balance between heat generation, increased heat recirculation, and heat loss is reestablished stabilizing the flame to stand again. This process is observed between the time intervals of t=0-19, t=45-78, t=78-100, t=100-145, t=145-178, and t=178-265 minutes in FIG. 4. The drop in temperature at the thermocouple location with the highest temperature after the dashed line, and the increase in temperature of the next thermocouple location after the dash line in figure FIG. 4 demonstrates how the combustion wave moved downstream as the $\Phi$ was reduced. For example the temperature peak detected by thermocouple T4 occurred around t=220 minutes, while that for T3 is around t=190 minutes. One might conclude that as the $\Phi$ is reduced, the flame location moves in the downstream direction. The downstream movement of the combustion wave due to lowering of the $\Phi$ is more apparent in FIG. 5, as explained in the following.

Figure 5:
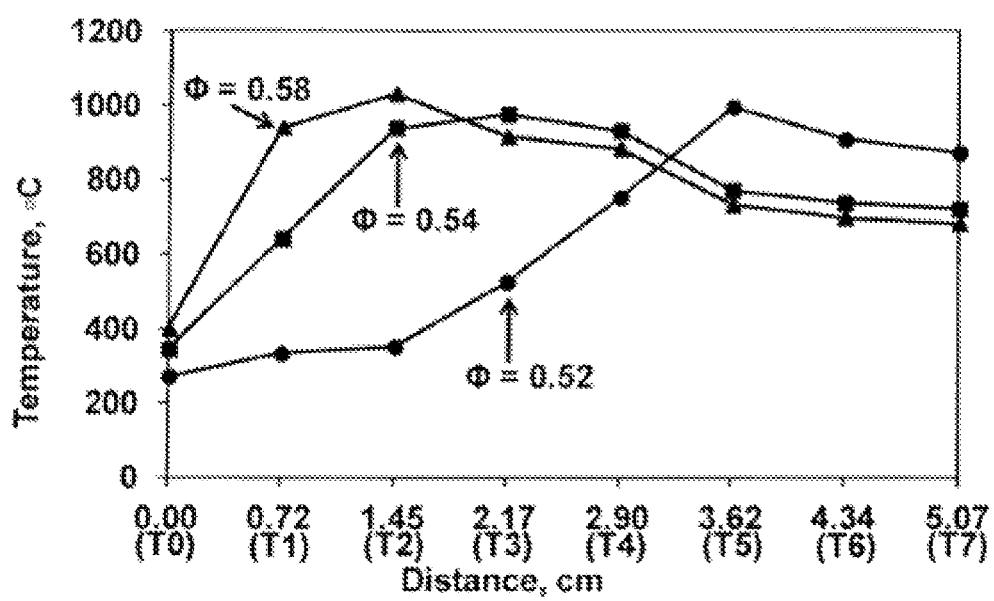
FIG. 5 is a graphical representation of temperature of the thermocouple locations vs. axial distance along the axis of the combustion chamber in accordance with an embodiment.

Referring to FIG. 5, in one embodiment, a graphical representation of temperature of the thermocouple 7 locations vs. axial distance along the axis of the combustion chamber 100 (of the stabilized standing combustion wave at 0.57, 0.54 and 0.52 equivalence ratios) is shown. FIG. 5 shows that the flame moves and stabilizes at a downstream location once the equivalent ratio is reduced; the temperature profiles shown are taken when the burner has reach steady state, and the flame has begun to stand. Additionally the magnitude of the displacement due to the change in $\Phi$ becomes apparent. The temperature distribution at $\Phi=0.58$, taken at t=98 minutes, show the flame stabilized at the thermocouple location T2, with a maximum temperature of 1,030° C. At $\Phi=0.54$ the flame has propagated downstream from thermocouple location T2 and has begun to stand at thermocouple location T3, with a maximum temperature of 975° C. At $\Phi=0.52$ the flame stabilized at thermocouple location T5, with a maximum temperature of 994.3° C. The flame moved downstream from the thermocouple location T2 to T5 as $\Phi$ was reduced from 0.58 to 0.52.

Figure 6:
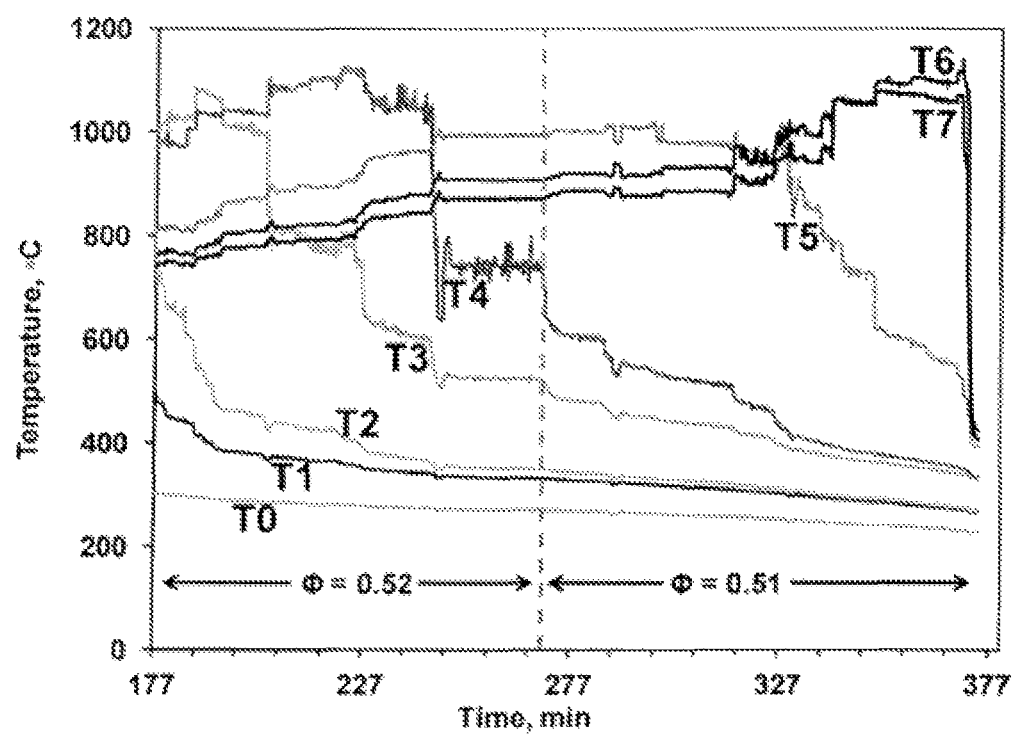
FIG. 6 is a graphical representation of temperature vs. time of non-coated SiC at lowest equivalent ration in accordance with an embodiment.

Referring to FIG. 6, in one embodiment, a graphical representation of temperature vs. time of non-coated SiC at lowest equivalent ration (minimum stable equivalence ration happens between min. 250-270) is provided. FIG. 6 shows the data with higher resolution from the same run as FIG. 4 for t=177-377 minutes, a shorter time range towards the end of the experiment. At t=177 min the wave is stabilized at thermocouple location T3, with a Tmax=1,004° C. After the $\Phi$ has been reduced the temperature at that location drops at t=185 min, followed by an increase at thermocouple location T4 from T=976 to T=1099. This is due to the downstream motion of the combustion wave. Eventually the downstream displacement motion of the combustion wave slows down and begins to stand, starting at 250 minutes, the temperature profile around minute 260 is the location of the temperature profile ($\Phi$=52) in FIG. 5. Additionally it is evident that after reducing the $\Phi$ again, minute 270 of FIG. 6, the downstream motion of the wave continues to thermocouple location T6 and T7 until it is quenched by the lower porosity honey comb alumina ceramic. Thus the temperature profile at minute 260 of FIG. 6, and the line labeled ($\Phi$=52) in FIG. 5 are at the lowest stabilized $\Phi$ where the combustion chamber can sustain a standing wave.

Example 4

This Example describes results of experiments performed to collect data for inert SiC reticulated porous media, and catalytically enhanced SiC. Table 1 below shows the tabulated results, specifically the minimum stable $\Phi$ achieved, for inert uncoated SiC articulated ceramic foam and for the SiC catalytically enhanced with five different compositions of perovskite catalyst: $La_{0.75}Sr_{0.25}Fe_{0.60}Cr_{0.35}Ru_{0.05}O_3$, $La_{0.75}Sr_{0.25}Fe_{0.60}Cr_{0.40}O_3$, $La_{0.75}Sr_{0.25}Cr_{0.95}Ru_{0.05}O_3$, $LaFe_{0.95}Ru_{0.05}O_3$, and $La_{0.75}Sr_{0.25}Fe_{0.95}Ru_{0.05}O_3$.

TABLE 1

Inert and Peroviskite coated SiC Tabulated Results

| Coating Composition of SiC Articulated Foam | $T_{max}$ at $\Phi$ = 0.58, ° C. | $T_{max}$ at Minimum Stable $\Phi$, ° C. | Minimum Stable $\Phi$ | Number of Runs |
| --- | --- | --- | --- | --- |
| Un-Coated (Inert) | 1030.9 | 994.3 | 0.547 ± 0.018 | 4 |
| $La_{0.75}Sr_{0.25}Fe_{0.60}Cr_{0.35}Ru_{0.05}O_3$ | 1158.5 | 1081.4 | 0.525 ± 0.021 | 2 |
| $La_{0.75}Sr_{0.25}Fe_{0.60}Cr_{0.40}O_3$ | 989.4 | 1056.2 | 0.525 ± 0.007 | 2 |
| $La_{0.75}Sr_{0.25}Cr_{0.95}Ru_{0.05}O_3$ | 953.9 | 1041.5 | 0.535 ± 0.007 | 2 |
| $LaFe_{0.95}Ru_{0.05}O_3$ | 1033.7 | 1072.9 | 0.53 | 1 |
| $La_{0.75}Sr_{0.25}Fe_{0.95}Ru_{0.05}O_3$ | 906.6 | 1039.2 | 0.51 ± 0.01 | 3 |

The ± sign in the table shows the standard deviation, or run to run variation, between the results of the multiple runs with the same configuration of coated or uncoated articulated foam ceramics. This table shows that all five above-referenced different perovskite compositions yielded better results at lowering the minimum stable $\Phi$ compared with the uncoated inert SiC articulated foam.

Figure 7:
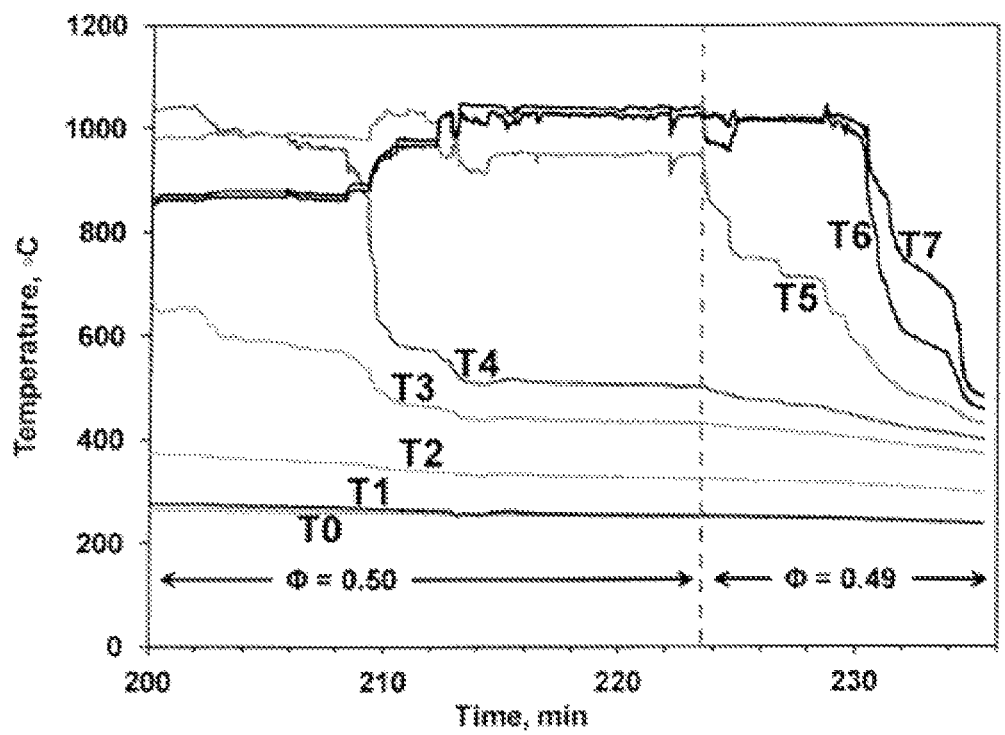
FIG. 7 is a graphical representation of temperature vs time of $La_{0.75}Sr_{0.25}Fe_{0.95}Ru_{0.05}O_3$ coated SiC at lowest equivalent ratio in accordance with an embodiment.

Referring to FIG. 7, in one embodiment, a graphical representation of temperature vs time of $La_{0.75}Sr_{0.25}Fe_{0.95}Ru_{0.05}O_3$ coated SiC at lowest equivalent ratio (minimum stable equivalence ratio happen between min 215-223) is provided. FIG. 7 shows the ending minutes of a run with SiC porous combustion chamber enhanced with $La_{0.75}Sr_{0.25}Fe_{0.95}Ru_{0.05}O_3$. The data was collected with the same procedure as the data collected for the uncoated SiC foam run(s) shown in FIGS. 4-6, as well as all the SiC foams coated with the five different types of perovskites. The flame was successfully stabilized for $\Phi$=0.5 at the thermocouple location T6 with a $T_{max}$ of 1039° C. The minimum average $\Phi$ achieved by an inert SiC articulated foams was 0.547 while the catalytically enhanced SiC porous media were able to reduce the minimum stable $\Phi$ to 0.535-0.51; $La_{0.75}Sr_{0.25}Fe_{0.95}Ru_{0.05}O_3$ perovskite provided the best results with a minimum average $\Phi$ of 0.51.

Figure 8:
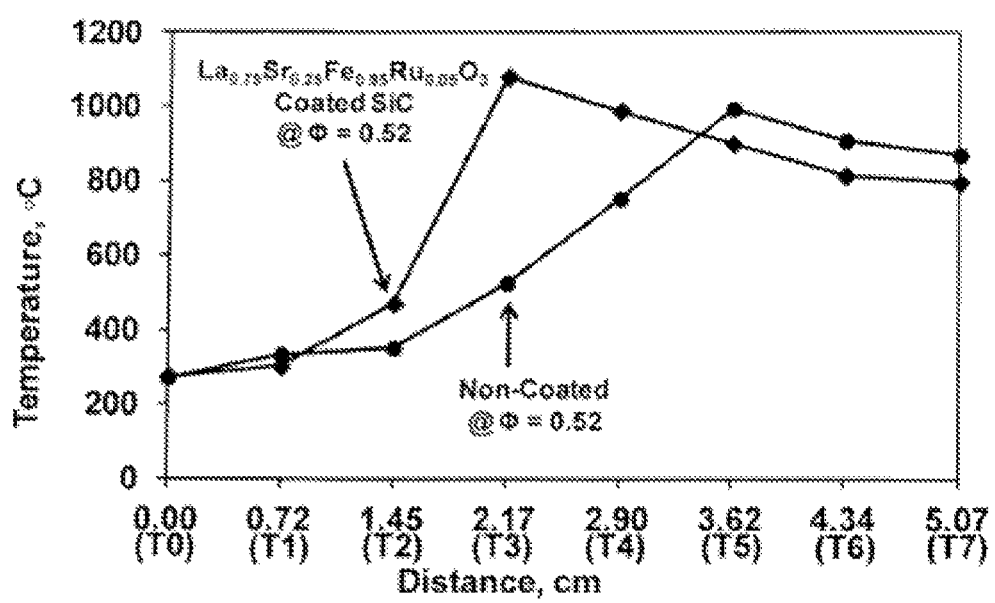
FIG. 8 is a graphical representation of a temperature gradient comparison between coated and non-coated SiC at the same equivalence ratio in accordance with an embodiment.

Referring to FIG. 8, in one embodiment, a graphical representation of a temperature gradient comparison between coated and non-coated SiC at the same equivalence ratio is provided. FIG. 8 shows another feature of the perovskite catalytic enhancement of an embodiment in combustion in porous media. It shows the temperature distribution of non-coated SiC compared with the catalytically $La_{0.75}Sr_{0.25}Fe_{0.95}Ru_{0.05}O_3$ enhanced SiC at a matching $\Phi$ of 0.52. The perovskite coated SiC stabilized at the thermocouple location T3, with a $T_{max}$ of 1072° C., while the non-coated SiC stabilized at the thermocouple location T5, with a $T_{max}$ of 994° C. It is a total of 1.45 cm of displacement difference of the flame location, while having both the same $\Phi$, and volumetric flow rate.

Figure 9:
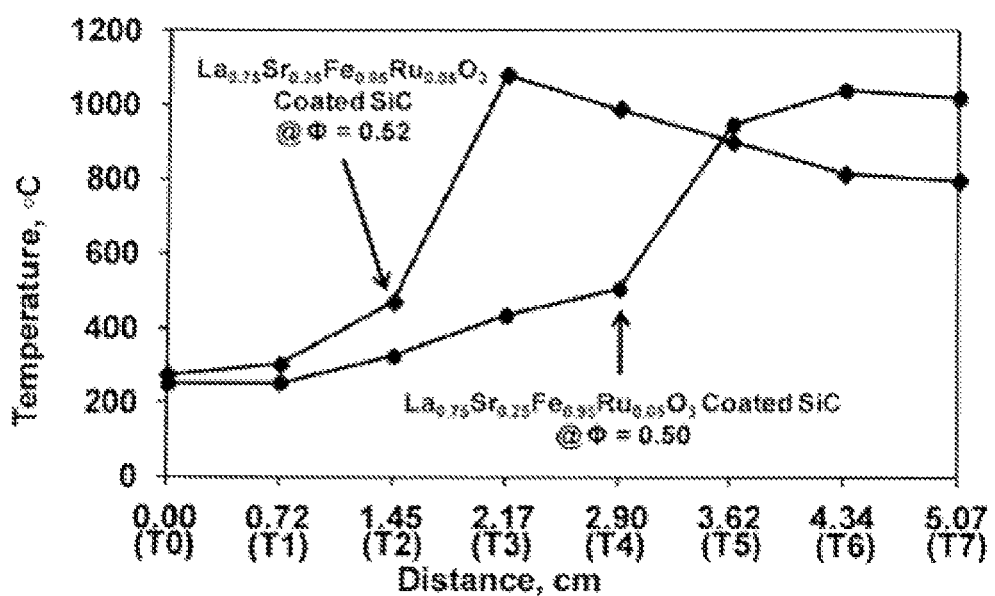
FIG. 9 is a graphical representation of a temperature gradient as a function of equivalence ratio of a $La_{0.75}Sr_{0.25}Fe_{0.95}Ru_{0.05}O_3$ coated SiC at different equivalent ratios in accordance with an embodiment.

Referring to FIG. 9, in one embodiment, a graphical representation of a temperature gradient as a function of equivalence ratio of a $La_{0.75}Sr_{0.25}Fe_{0.95}Ru_{0.05}O_3$ coated SiC at different equivalent ratios is provided. FIG. 9 shows the temperature distribution of the enhanced SiC with $La_{0.75}Sr_{0.25}Fe_{0.95}Ru_{0.05}O_3$ at a stabilized standing wave with an $\Phi$ of 0.52 and 0.50. The minimum stable $\Phi$ was 0.5, that the flame stabilized to a standing wave was located at T6. While at $\Phi$=0.52 the flame successfully stabilized at T3.

Thus, by examining results of FIGS. 8 and 9, it is evident that by coating the porous SiC articulated foam with perovskite catalysts the combustion wave is able to stabilize closer to the inlet at any given $\Phi$, in the same way an increase in $\Phi$ (as seen in FIG. 5) or lowering of the flow rate can help stabilize the flame upstream. For the flame to stabilize at a given position in the porous media it is preferable that the right balance of chemical input, thermal energy recirculation, and heat loss occur. By enhancing the surface area of the porous media with high temperature perovskite catalysts as described and contemplated herein, the activation energy required to release the chemical energy of the reactants can be reduced. It effectively increases the minimum stable $\Phi$ that a catalyzed porous burner can achieve.

According to the preceding disclosure, embodiments of a porous burner are described that include high temperature catalysts. The porous burner can require little to no maintenance, has a noise-free operation, is low weight and low volume, has fuel flexibility, produces less harmful emissions and can provide efficient combustion as compared with other available devices. The porous burner provides simplicity in accomplishing its tasks without significant pressure drop: reduces the lean limit of a mixture of natural gas' and air to produce a flame where the temperature is low enough for the perovskite catalysts to remain active, low enough for the materials within the combustion chamber not to degrade, and high enough for temperature within the fluid mixture to be ideal for heat and power applications. The porous burner can be utilized by any kind of application where internal combustion engines are relevant. Certain promising applications of the porous burner of an embodiment include: water heaters, gas stoves, boilers, portable generators, turbine combustion chambers etc. (i.e., any kind application where internal combustion engines are relevant).

While several embodiments of the invention have been discussed, it will be appreciated by those skilled in the art that various modifications and variations of the present invention are possible. Such modifications do not depart from the spirit and scope of the present invention.

What is claimed is:

1. A three section matrix stabilized porous burner comprising a high porosity combustion chamber between two lower porosity sections wherein the high porosity combustion chamber comprises a porous ceramic matrix catalytically enhanced with a perovskite catalyst composition selected from the group consisting of:
$La_{0.75}Sr_{0.25}Fe_{0.6}Cr_{0.35}Ru_{0.05}O_3$;
$La_{0.75}Sr_{0.25}Fe_{0.6}Cr_{0.4}O_3$;
$La_{0.75}Sr_{0.25}Fe_{0.95}Ru_{0.05}O_3$;
$La_{0.75}Sr_{0.25}Cr_{0.95}Ru_{0.05}O_3$; and
$LaFe_{0.95}Ru_{0.05}O_3$.

2. The burner of claim 1, wherein the porous ceramic matrix comprises a silicon carbide porous ceramic matrix portion, and the perovskite catalyst is coated on the surface of the porous silicon carbide ceramic matrix portion.

3. The burner of claim 2, wherein the porous ceramic matrix further comprises an alumina porous ceramic matrix portion positioned adjacent to the silicon carbide porous ceramic matrix portion.

4. The burner of claim 1, wherein the porous ceramic matrix catalytically enhanced with a perovskite catalyst composition lowers the equivalence ratio.

5. The burner of claim 1, wherein the porous ceramic matrix comprises 85% porosity silicon carbide.

6. The burner of claim 1, wherein burner is a unidirectional porous burner.

7. A method for the superadiabatic combustion of reactants comprising the steps of:
providing a three section matrix stabilized porous burner comprising: a high porosity combustion chamber between two lower porosity sections wherein the high porosity combustion chamber comprises a porous ceramic matrix catalytically enhanced with a perovskite catalyst composition selected from the group consisting of:
$La_{0.75}Sr_{0.25}Fe_{0.6}Cr_{0.35}Ru_{0.05}O_3$;
$La_{0.75}Sr_{0.25}Fe_{0.6}Cr_{0.4}O_3$;
$La_{0.75}Sr_{0.25}Fe_{0.95}Ru_{0.05}O_3$;
$La_{0.75}Sr_{0.25}Cr_{0.95}Ru_{0.05}O_3$; and
$LaFe_{0.95}Ru_{0.05}O_3$; and
reacting a fuel and air mixture in the combustion chamber.

8. The method of claim 7, wherein the porous ceramic matrix comprises a silicon carbide porous ceramic matrix portion, and the perovskite catalyst is coated on the surface of the porous silicon carbide ceramic matrix portion.

9. The method of claim 8, wherein the porous ceramic matrix further comprises an alumina porous ceramic matrix portion positioned adjacent to the silicon carbide porous ceramic matrix portion.

10. The method of claim 7, wherein the fuel air mixture is a lean mixture of natural gas and air.

11. The method of claim 7, wherein porous ceramic matrix comprises 85% porosity silicon carbide.

12. The method of claim 7, wherein burner is a unidirectional porous burner.

* * * * *